United States Patent [19]

Pennell

[11] 4,360,314
[45] Nov. 23, 1982

[54] LIQUID METAL PUMP

[75] Inventor: William E. Pennell, Greensburg, Pa.

[73] Assignee: The United States of America as represented by the United States Department of Energy, Washington, D.C.

[21] Appl. No.: 128,986

[22] Filed: Mar. 10, 1980

[51] Int. Cl.³ .............................................. F04D 29/44
[52] U.S. Cl. .............................. 415/219 A; 415/219 C
[58] Field of Search ............... 415/219 C, 219 A, 136; 417/360

[56] References Cited

U.S. PATENT DOCUMENTS

| 3,437,047 | 4/1969 | Walsh et al. | 415/219 C |
| 3,625,639 | 12/1971 | Eggmann et al. | 417/360 |
| 3,671,149 | 6/1972 | Fraser et al. | 417/360 |
| 3,910,714 | 10/1975 | Allen et al. | 415/219 C |

FOREIGN PATENT DOCUMENTS 1223997 3/1971 United Kingdom ................ 417/360

OTHER PUBLICATIONS

Clinch River Breeder Reactor Plant Project 1977 Technical Progress Report, CRBRP-ARD-0211, pp. 185-190.

Primary Examiner—Leonard E. Smith
Attorney, Agent, or Firm—L. A. DePaul; Z. L. Dermer

[57] ABSTRACT

The liquid metal pump comprises floating seal rings and attachment of the pump diffuser to the pump bowl for isolating structural deflections from the pump shaft bearings. The seal rings also eliminate precision machining on large assemblies by eliminating the need for a close tolerance fit between the mounting surfaces of the pump and the seals. The liquid metal pump also comprises a shaft support structure that is isolated from the pump housing for better preservation of alignment of shaft bearings. The shaft support structure also allows for complete removal of pump internals for inspection and repair.

7 Claims, 6 Drawing Figures

LIQUID METAL PUMP

GOVERNMENT CONTRACT

The invention described herein was made in the course of, or under, Contract No. E(11-1)2395 with the United States Department of Energy.

BACKGROUND OF THE INVENTION

This invention relates to nuclear reactor coolant pumps and more particularly to liquid metal fast breeder reactor coolant pumps.

Design studies completed to date for liquid metal fast breeder reactor pumps have centered on concepts derived from established light water reactor (LWR) pump designs. These studies have shown that the light water reactor type pump configuration may be unsuited for liquid metal fast breeder reactor (LMFBR) service. Some of the problems encountered with light water reactor type pump concepts under LMFBR operating conditions are (a) high temperature structural design problems, (b) difficulties in maintaining alignment of the multiple shaft bearings, (c) excessive leakage flow, (d) potential galling and self-welding problems, (e) a requirement for close tolerance machining and dimensional stability in large fabricated stainless steel structures, and (f) limited accessibility for inspection and repair.

In general, the structural configuration of the light water reactor pumps creates no problems in the light water reactor operating environment since the combination of a low core temperature differential and the limited heat transfer capability of the cooling water reduces the severity of transient thermal stresses in the pump. However, in an LMFBR environment, both the reactor core temperature differential and the temperature change rates are substantially greater than in the light water reactor. These environmental characteristics coupled with the excellent heat transfer characteristics of liquid metal make thermal stresses of dominant importance in LMFBR components. The light water reactor type pump internals is not suited to serve under these conditions since the heavy structural sections, high degree of internal constructional constraint, and localized non-uniform exposure to the primary liquid metal flow all serve to increase the magnitude of transient thermal stresses in the pump structure and the associated rate of creep-fatigue damage accumulation.

Mechanical liquid metal pumps utilize impeller-shroud seals and hydrostatic bearings which cannot accommodate large changes in working clearances. In order to maintain the required control of working clearances, distortion of the pump shaft support structure and the impeller shroud structure must be minimized. Control of impeller shroud structure distortion requires that the structure respond uniformly to the large temperature changes which occur rapidly in the coolant of an LMFBR during a reactor transient. This uniform structural response to coolant transients is not readily accomplished in an LMFBR pump derived from LWR pump designs since the LWR pump internals configuration does not expose the surfaces of the shroud structural elements to the primary coolant flow in a uniform and axisymmetric manner.

In an LMFBR pump design derived from LWR practice, the bearings and shroud support structure are either supported directly by the pump outer casing or coupled to it by means of a close tolerance fit between the support structure and the pump casing. Under these conditions the bearing and impeller shroud support structure are constrained to follow any distortion experienced by the pump casing. Major causes of non-axisymmetric distortion of the pump casing are temperature gradients in the pump casing and mechanical loads applied to the pump casing by the attached pipes. The effect of these external influences on pump casing distortion is more severe in an LMFBR pump than in a LWR pump due to the unique conditions associated with liquid metal. Sealing of the pump shaft pressure boundary penetration in an LMFBR pump can be accomplished satisfactorily only if the seal is at a temperature well below that of the sodium coolant, and is not in direct contact with the coolant. These conditions are achieved by incorporating a pump tank into the pump design. Coolant in the pump tank has a free surface which moves axially in response to changes in the pump operating conditions. The axial length of pump tank required to accommodate both the free surface level changes (draw down) and the necessary insulation and shielding material, makes the overall length of an LMFBR pump substantially greater than that of an equivalent LWR pump. Pump supports are typically located at the top of this length while pipes are attached at the bottom. Bending deflections of the pump tank under the action of pipe thrust loads increase approximately as the third power ($l^3$) of the pump tank length. In the LMFBR pump, therefore, bending deflections of the pump tank, and the associated deflections of any directly coupled bearing and impeller shroud support structures, are substantially greater than they would be in a LWR pump. These deflections are limited by using heavy structural sections in the LWR pump, but this approach cannot be used in the LMFBR pump due to the unacceptable response of heavy structured sections to the severe LMFBR transients.

In addition, convection currents outside the pump casing can induce sever transverse temperature gradients in that portion of the LMFBR pump tank which lies above the free sodium surface. Bowing of the pump tank in response to these temperature gradients can induce additional unacceptable bearing and shroud structure deflections. This condition does not exist in LWR pumps and therefore LWR pump technology offers no guide to the solution of this element of the problem.

In a typical LWR pump, many surfaces within the pump are not directly exposed to the primary coolant flow. A similar situation exists in LMFBR pump designs derived from LWR pump concepts. Surfaces not directly exposed to the primary coolant flow will have a thermal response to transient changes in coolant temperature which lags behind the response of those surfaces which unavoidably must be directly exposed to the primary coolant flow. The resulting out-of-phase thermal response produces transient thermal stresses and deflections in the pump structures. These stresses and deflections can be accommodated in a LWR pump because the magnitude of the reactor system temperature differential is small, and its effect on structural response is further reduced by the low film heat transfer coefficient of the cooling water. In an LMFBR pump however, the combination of a high reactor system temperature differential and the excellent heat transfer characteristics of liquid sodium, make the thermal stresses and deflections produced by out-of-phase thermal response of the structure unacceptably high. Special provisions must be made in the design of an LMFBR pump to promote in-phase response of all structural elements. In LMFBR pump designs derived from LWR concepts the means used to reduce phase differences in structural response is to divert some of the pump outlet primary coolant flow into areas which would otherwise not be exposed to the primary coolant flow. This solution suffers from the disadvantage that all high pressure primary coolant flow diverted for transient temperature control purposes is also diverted during steady state operation. Diversion of pump outlet flow for this purpose results in a direct loss in pump efficiency. The loss in efficiency can be significant since for the control of transient temperature response to be effective, significant amounts of outlet flow must be diverted. A solution is required in which the necessary uniform transient temperature response of pump structures can be achieved without utilization of leakage flow and without impact on pump efficiency.

The duty cycle for an LMFBR pump includes transient conditions which result in a temperature change differential between the pump tank boundary and pump shaft support structure. This differential temperature change results in differential axial expansion of the two structures. If the two structures are in forced contact at the seal locations, the axial sliding motion must take place in the presence of high contact stresses. These conditions introduce a potential for material galling and self-welding failure. A feasible design for an LMFBR should thus include elimination of the high interface loads at locations of differential motion to eliminate material galling and self-welding failure.

In the conventional light water reactor pump design, sealing between the pump internals and the pump bowl is achieved by means of a close tolerance fit between the mating surfaces on the two components. When these structures are increased to the size required for an LMFBR adaptation of the design, the resulting machine tolerances become very difficult, if not impossible, to achieve. A further difficulty relative to the maintenance of the tight tolerance seal results from a lack of dimensional stability in the structures. The structures cannot be stress relieved following fabrication since this would result in sensitization of the stainless steel structural material. Experience has shown, however, that non-stress relieve stainless steel structures will distort both during fabrication and during operation. It is essential that the pump design be able to accommodate this distortion without any impact on its functional capability.

Pump maintenance and repair considerations dictate that the pump internals in an LMFBR pump be designed such that various parts of the pump may be removed for in service repair and inspection. The ideal internals configuration from this viewpoint is one which leaves the entire inner surface of the pump tank exposed for inspection and repair.

Therefore, what is needed is a liquid metal pump wherein the problems associated with high temperature structural design, bearing and seal alignment, leakage flow, galling and self-welding, manufacturing tolerances and dimensional stability, and inspection and repair are greatly reduced or eliminated.

SUMMARY OF THE INVENTION

The liquid metal pump comprises floating seal rings and attachment of the pump diffuser to the pump bowl for isolating structural deflections from the pump shaft bearings. The seal rings also eliminate precision machining on large assemblies by eliminating the need for a close tolerance fit between the mounting surfaces of the pump and the seals. The liquid metal pump also comprises a shaft support structure that is isolated from the pump housing for better preservation of alignment of shaft bearings. The shaft support structure also allows for complete removal of pump internals for inspection and repair.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings wherein:

DESCRIPTION OF THE PREFERRED EMBODIMENT

Figure 1:
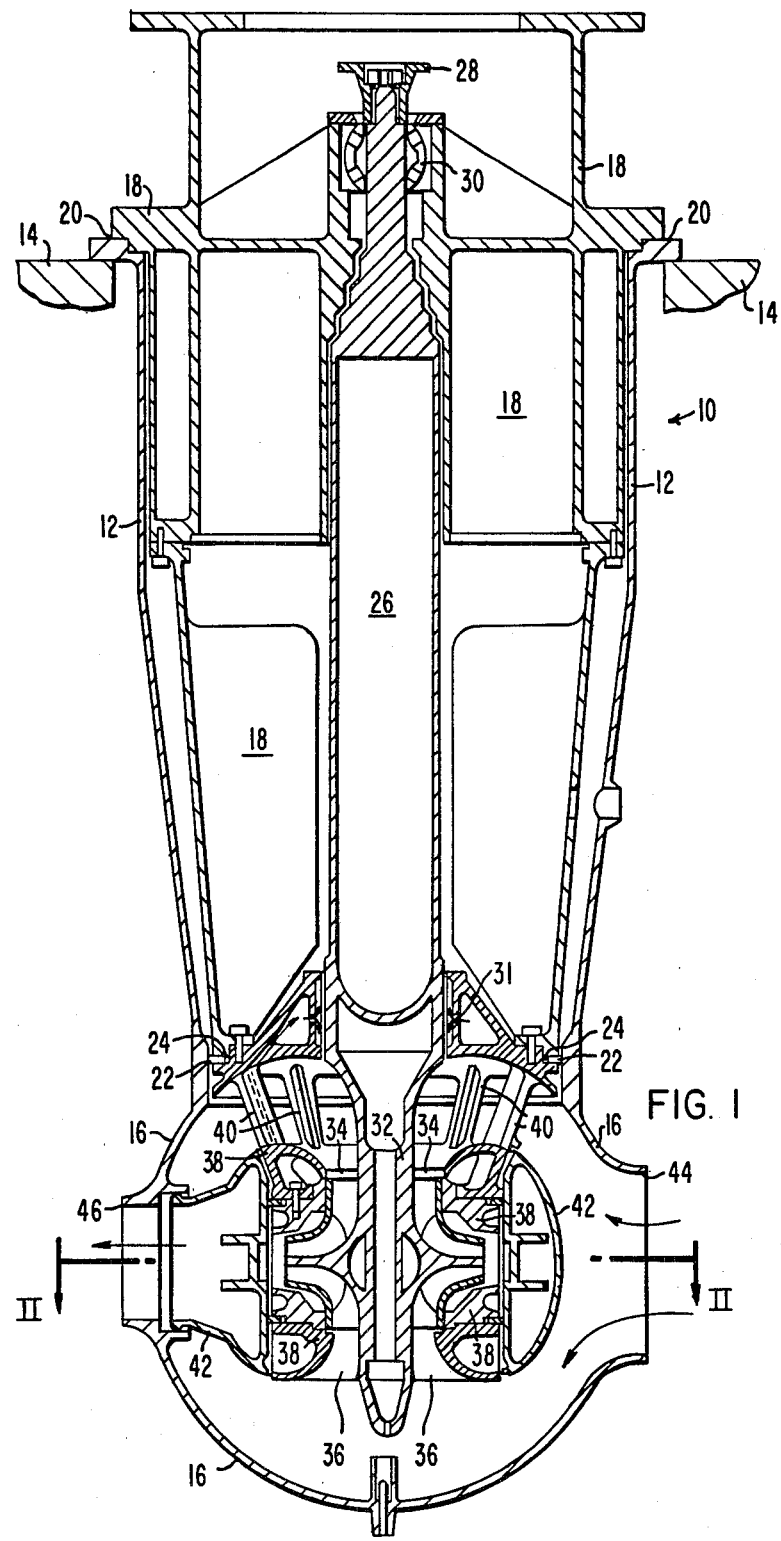
FIG. 1 is a cross-sectional view in elevation of the liquid metal pump.
Figure 2:
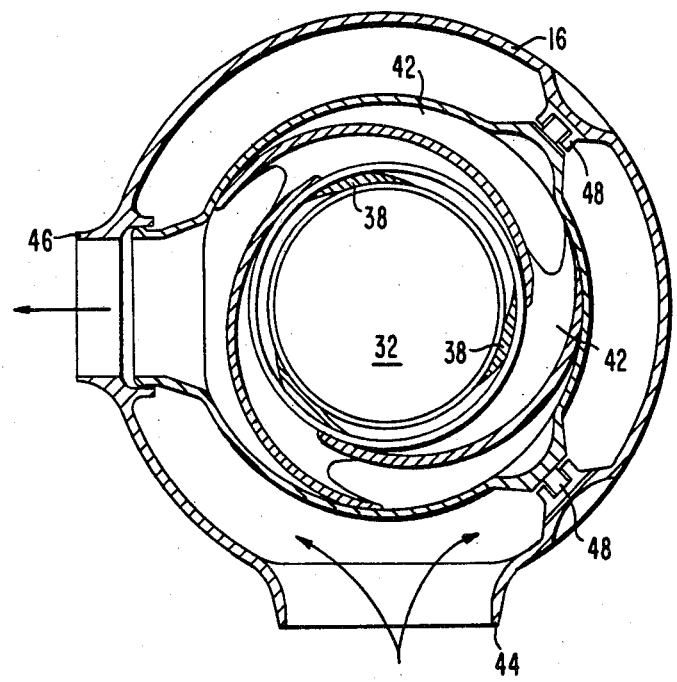
FIG. 2 is a view along line II—II of FIG. 1.
Figure 3:
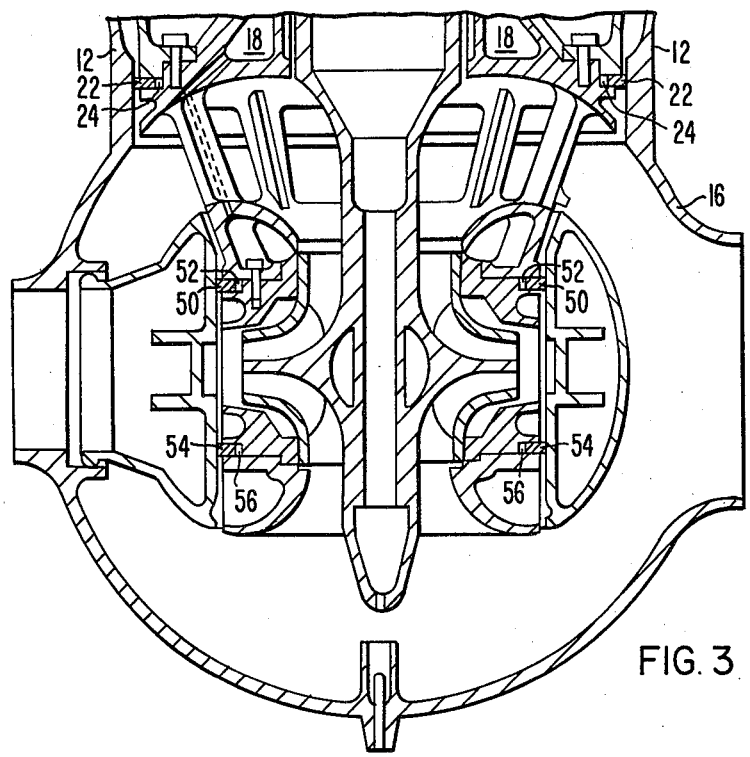
FIG. 3 is a cross-sectional view in elevation of the lower portion of the liquid metal pump.
Figure 4:
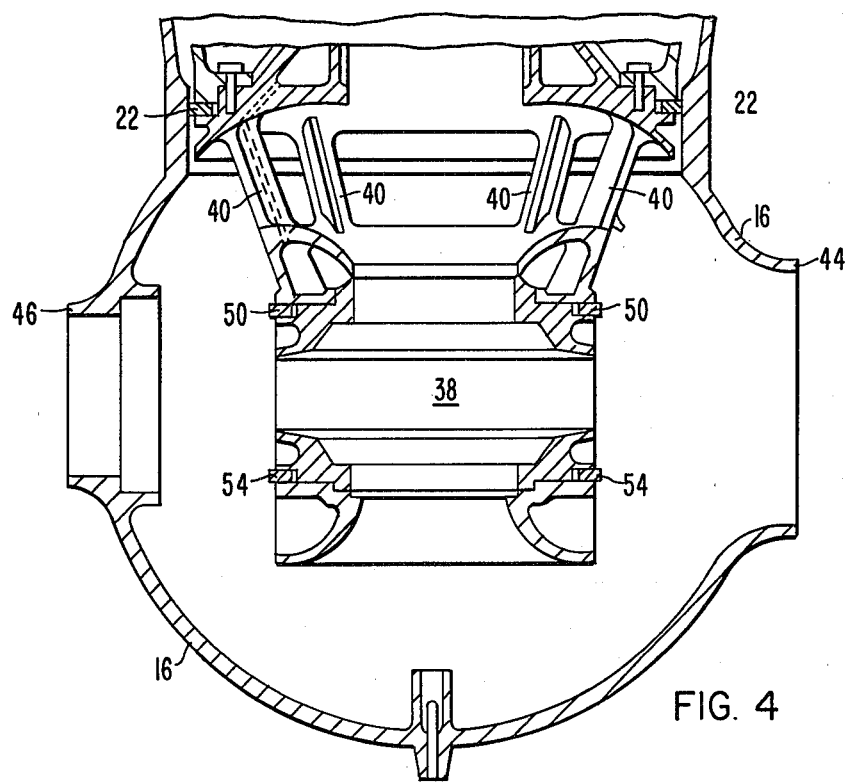
FIG. 4 is a cross-sectional view in elevation of the lower portion of the liquid metal pump with the impeller and diffuser assemblies removed.

Referring to FIGS. 1-4, the liquid metal pump is referred to generally as 10 and comprises an upper housing 12 which is attached to a permanent support 14 and has a lower housing 16 attached to its lower end. Lower housing 16 which may be integral with upper housing 12 is a spherically shaped member. Liquid metal pump 10 also comprises upper pump internals 18 which are disposed within upper housing 12 and are attached to upper housing 12 by an external seal 20. External seal 20 seals along the circumference of the top portion of upper housing 12 and the top portion of upper internals 18. The attachment of upper internals 18 to upper housing 12 at external seal 20 is the only load bearing support of upper internals 18. However, a first metal seal ring 22 is disposed in the lower portion of upper internals 18 so as to extend along the outer circumference of upper internals 18. First seal ring 22 also contacts upper housing 12 and creates a seal therebetween. First seal ring 22 is disposed in first slot 24 of upper internals 18 such that when upper internals 18 is subjected to a lateral force, upper internals 18 may shift laterally with respect to first seal ring 22 without creating stresses in upper internals 18. First seal ring 22 also serves to impede the flow of coolant between the upper housing and lower housing during a pump transient. A pump shaft 26 is disposed in upper internals 18 and extends into lower housing 16. Pump shaft 26 has a coupling 28 on its upper end for attachment to a pump motor (not shown). A spherical bearing 30 is disposed in upper internals 18 for supporting pump shaft 26 from upper internals 18 and a hydrostatic bearing 31 which operates with the liquid coolant is located near the lower end of pump shaft 26. Pump shaft 26 also has a double slided impeller 32 attached to its lower end. Impeller 32 has an upper inlet 34 that extends around pump shaft 26 and a lower inlet 36 which also extends around pump shaft 26. An impeller cage 38 surrounds impeller 32 and is supported from upper internals 18 by means of struts 40. Impeller cage 38 provides structural support for the lower flow guides and labyrinth seal assemblies. Struts 40 not only support impeller cage 38 but allow the coolant, which may be liquid sodium, to contact the inside of lower housing 16 and enter upper inlet 34. Struts 40 also have holes drilled therein to provide a passage whereby high pressure coolant can flow into hydrostatic bearing 31 thereby providing a working fluid for hydrostatic bearing 31. A removable high pressure toroidal diffuser assembly 42 is attached to lower housing 16 and is associated with impeller cage 38. Lower housing 16 has a fluid inlet 44 and a fluid outlet 46 which may be arranged at 90° to each other as shown in FIG. 2. The flow of fluid enters liquid metal pump 10 through fluid inlet 44 and flows into the spherical lower housing 16 so as to completely surround impeller 32, impeller cage 38, and diffuser assembly 44. The reactor coolant then is drawn into upper inlet 34 and lower inlet 36 under the action of the rotating impeller 32. The reactor coolant is guided into upper inlet 34 and lower inlet 36 by means of impeller cage 38 and associated members. From impeller 32 the reactor coolant is forced under pressure into diffuser assembly 44 from which the reactor coolant exists liquid metal pump 10 through fluid outlet 46.

Still referring to FIGS. 1-4, lower housing 16 is provided with a plurality of thrust pads 48 for supporting diffuser assembly 42 and for accommodating lateral forces that are applied to diffuser assembly 42. A second seal ring 50 is disposed in second slot 52 of impeller cage 38 while a third seal ring 54 is disposed in third slot 56 of impeller cage 38. Second slot 52 and third slot 56, which are similar to first slot 24, extend along the circumference of impeller cage 38 and provide a clearance such that lateral movement of diffuser assembly 42 relative to impeller cage 38 can be accommodated without developing stress loading in the various members of liquid metal pump 10. Second seal ring 50 and third seal ring 54 provide contact and sealing action between impeller cage 38 and diffuser assembly 42 thereby maintaining their alignment while accommodating relative movement.

Figure 5:
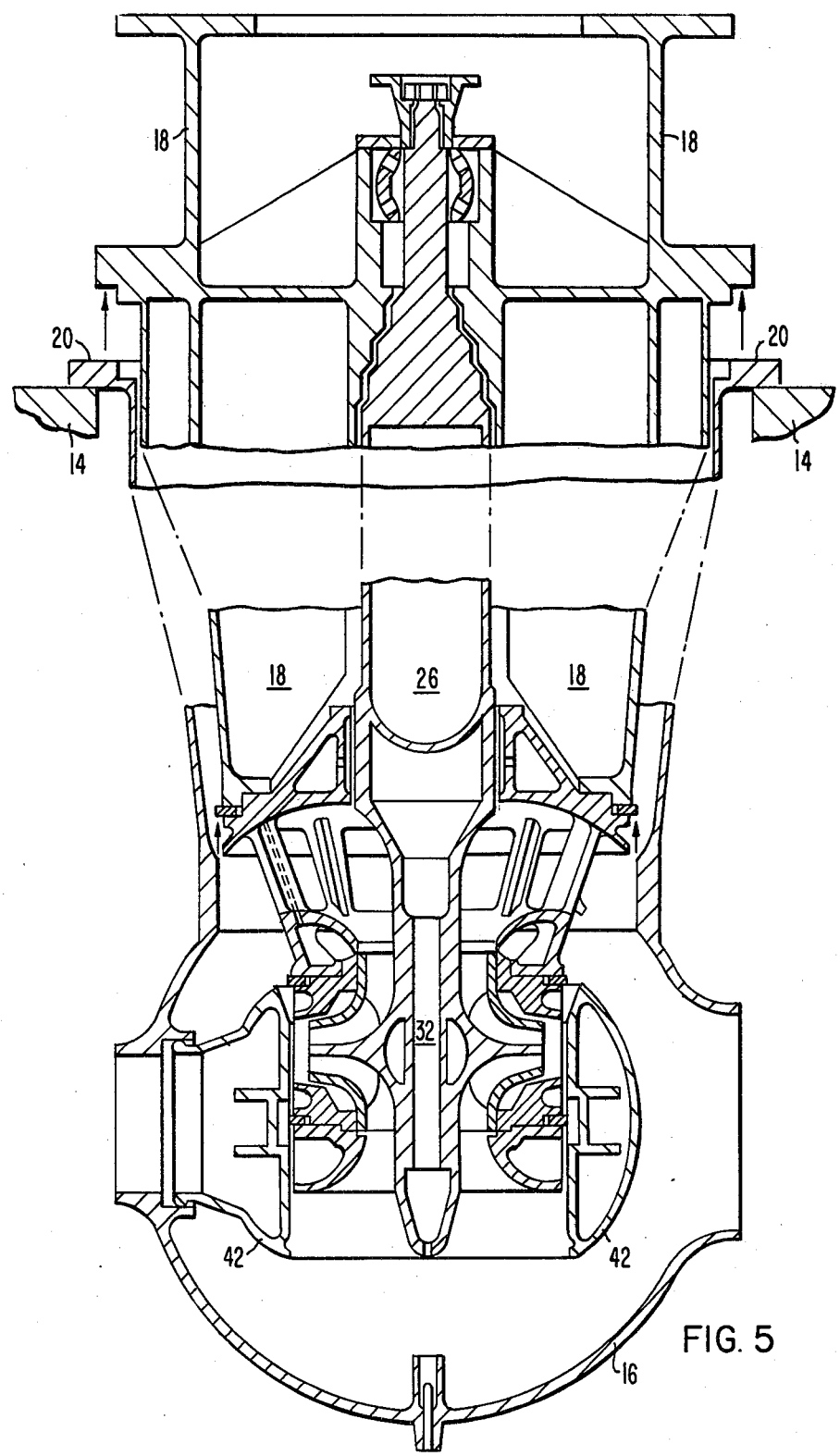
FIG. 5 is a cross-sectional view in elevation of the liquid metal pump showing the removability of the pump internals.

Referring now to FIG. 5, liquid metal pump 10 is designed such that upper internals 18, and impeller cage 38 can be removed by lifting the entire assembly vertically as shown in FIG. 5. As shown in FIG. 5, when the entire assembly is lifted vertically, diffuser assembly 42 remains attached to thrust pads 48 and fluid outlet 46. Moreover, diffuser assembly 42 is designed to be removable. When this assembly has been entirely removed from upper housing 12, a complete inspection can be made of upper housing 12 and lower housing 16. In addition, inspection and repair can be made on the assembly that has thus been removed.

Figure 6:
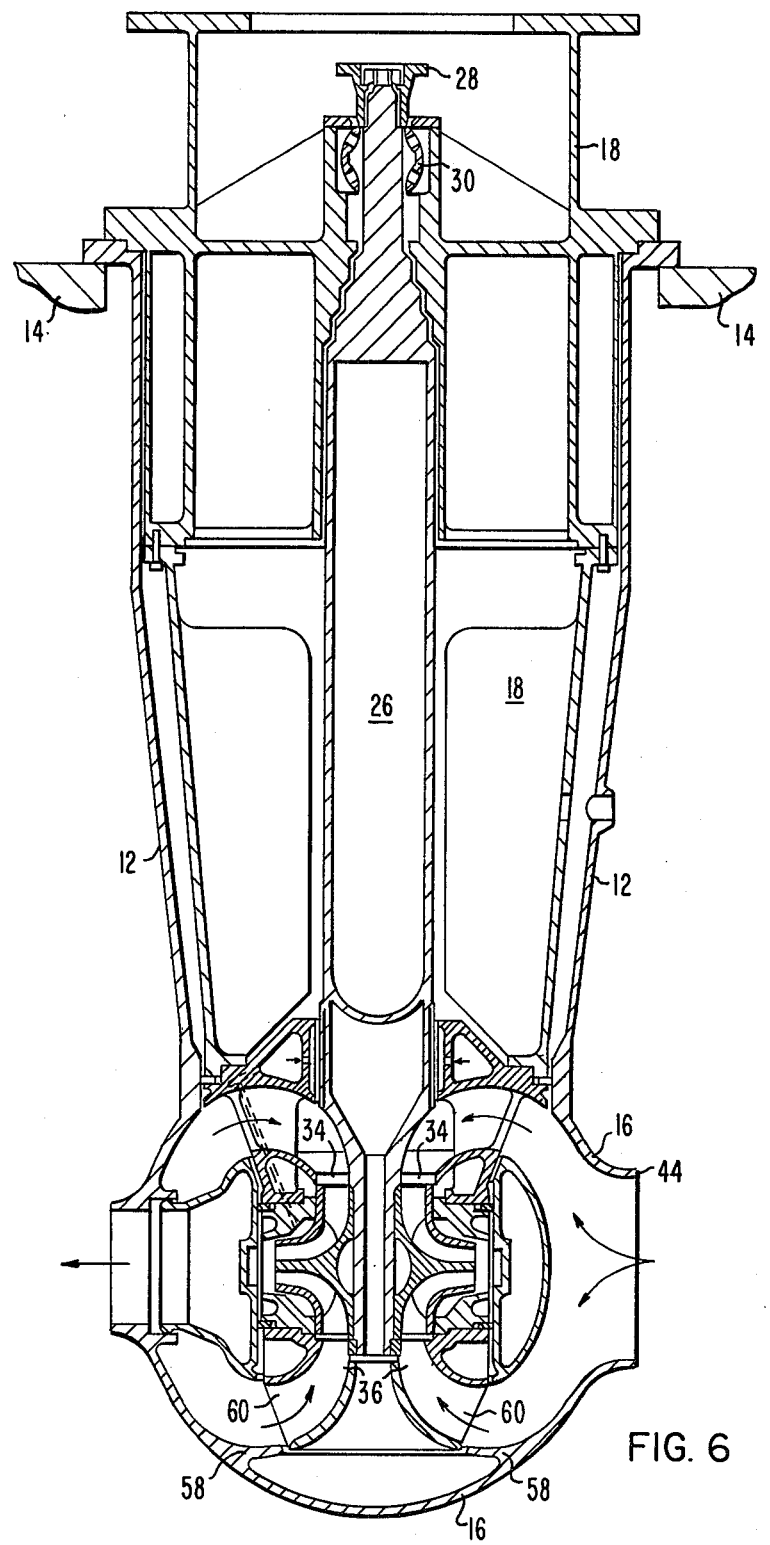
FIG. 6 is a cross-sectional view in elevation of an alternate design for the liquid metal pump.

Referring now to FIG. 6, as an alternative to the liquid metal pump 10 shown in FIG. 1, liquid metal pump 10 can also be provided with a guided inlet. In order to provide liquid metal pump 10 with a guided inlet, lower housing 16 is formed to have an internal guide 58 which mates with a guided lower section 60 of impeller cage 38. In addition, the lower portion of upper internals 18 is formed into a guided inlet along with struts 40. In this manner, the flow is guided from fluid inlet 44 into upper inlet 34 and lower inlet 36 of impeller 32.

As shown in the drawings, the flow of coolant is channeled from fluid inlet 44 to upper inlet 34 and lower inlet 36 by means of a spherical flow chamber defined by lower housing 16. Since the incoming reactor coolant may experience extremely high temperature changes, the structures that it may contact could develop severe thermal stresses therein. However, since all of the structures contained within lower housing 16 receive axisymmetric exposure to the reactor coolant flow, the thermal stresses and deformation problems resulting from transient temperature maldistributions are, therefore, minimized. Diffuser assembly 42 is designed such that the pressure loads produce primarily membrane tension loading in the structural walls. The structural efficiency which results from the extensive use of membrane loading permits the use of thin structural sections with low thermal inertia. Moreover, all sections of diffuser assembly 42 are directly exposed to the primary coolant which thereby minimizes transient temperature maldistributions therein.

As is apparent from the drawings, the thrust load generated by the outlet nozzle opening in the high pressure side of the diffuser assembly 42 is reacted directly by thrust pads 46 and lower housing 16. Since impeller cage 38 is sealed to diffuser assembly 42 by means of floating seal rings, the seal rings will not transmit any significant lateral load to impeller 32 and pump shaft 26. The pump shaft support structure is, therefore, isolated from the out-of-balance pressure loads created by the flow of coolant through the pump. The floating seal rings also serve to isolate pump shaft 26 and the support structure for pump shaft 26 from deflections imposed on upper housing 12 and lower housing 16 which may be caused from loading from adjacent pipes or distortions generated within upper housing 12. It should be noted, that the pump features which must be held in close alignment with the pump rotating members are the bearings and the seals. Mounting all of these components on a structure which is isolated from external sources of deformation substantially reduces the amount of malalignment which can occur during operation.

With the invention as described herein, there are no large pockets of reactor coolant within lower housing 16 that are isolated from the primary coolant flow. There is, therefore, no need to induce leakage flow to assure a temperature balance within lower housing 16 as is the case in certain pumps. In addition, the use of the floating seal rings eliminates the need for close tolerance to be maintained on the alignment of the centers of the sealing surfaces. This large tolerance on true position of the seal surface diameters is made possible by the eccentricity accommodation provided by the floating seal rings and the statically determinant nature of the three point support arrangement for diffuser assembly 42. All other machining relative to the seals is performed on the seal rings and local areas of the structures in which they are housed. This machining can be done to conventional machining limits for components and features of their size and still produce a high impedance leakage flow path. The seal design, therefore, makes possible the achievement of the low leakage performance by virtue of eliminating the requirement for precision mating of large fabricated assemblies. In addition, direct transmission of the diffuser assembly 42 out-of-balance pressure load to lower housing 16 by means of thrust pads 48 eliminates the need for load transmission across the seals. The problem of non-axisymmetric seal distortion under load is thereby eliminated, together with the associated increment of leakage flow. This combination of features significantly reduces the inherent pump internals cooling leakage rate.

Since all significant lateral interaction loads between the pump internals at the interfaces with diffuser assembly 42 and lower housing 16 are basically eliminated, differential axial expansion of the pump internals relative to upper housing 12 and lower housing 16 can take place under conditions of near zero interaction loading. Thus, the potential for galling and self-welding at these locations is eliminated.

Machine tolerance difficulties encountered in LMFBR adaptations of light water reactor type pump designs came about as a result of the need to achieve precision mating of large stainless steel structures in order to assure an effective high pressure sodium seal. The introduction of floating seal rings as described herein effectively eliminates this problem. The floating seal rings also render the pump performance insensitive to many of the structural distortions which can occur during manufacture and service of the pump.

The problem of limited accessibility for inspection and repair is eliminated in the present invention by the provision of the removability of the pump internals.

Therefore, the invention provides a liquid metal pump suitable for use in a liquid metal fast breeder reactor system.

I claim as my invention:

1. A liquid metal pump comprising:
a housing having a generally spherical lower section;
pump internals disposed in said housing and supported solely by attachment to said housing near the top thereof;
a pump shaft rotatably disposed in said pump internals;
a double sided impeller attached to said pump shaft for circulating a liquid metal;
an impeller cage supported from said pump internals and disposed around said impeller; and
a high pressure toroidial diffuser assembly attached to said spherical lower section of said housing with substantially all sections of said diffuser assembly being directly exposed to said liquid metal and being slidably disposed around but not attached to said impeller cage for conducting said liquid metal, said liquid metal pump providing axisymmetric distribution of said liquid metal in said pump and providing removability of said pump internals, pump shaft, impeller, and impeller cage as a unit.

2. The liquid metal pump according to claim 1 wherein said pump further comprises a plurality of thrust pads attached to said spherical lower section and to said diffuser assembly for supporting said diffuser assembly.

3. The liquid metal pump according to claim 2 wherein said diffuser assembly is connected to a fluid outlet of said pump.

4. A liquid metal pump comprising:
a housing having a generally spherical lower section;
pump internals disposed in said housing and supported solely by attachment to said housing near the top thereof;
a pump shaft rotatably disposed in said pump internals;
a double sided impeller attached to said pump shaft for circulating a liquid metal;
an impeller cage supported from said pump internals and disposed around said impeller;
a diffuser assembly attached to said spherical lower section of said housing and disposed around said impeller cage for conducting said liquid metal, said liquid metal pump providing axisymmetric distribution of said liquid metal in said pump and providing removability of said pump internals, pump shaft, impeller, and impeller cage as a unit;
a metal first seal ring disposed in a first slot in said pump internals with said first slot extending along the circumference of said pump internals thereby providing a clearance such that lateral movement of said diffuser assembly relative to said impeller cage can be accommodated without developing excessive stress in said diffuser assembly or said impeller cage and with said first seal ring arranged to contact said housing for sealing between said housing and said pump internals and for accommodating relative movement between said housing and said pump internals;
a metal second seal ring disposed in a second slot in said impeller cage with said second seal ring arranged to contact said diffuser assembly and for accommodating relative movement between said impeller cage and said diffuser assembly;
a metal third seal ring disposed in a third slot in said impeller cage with said third seal ring arranged to contact said diffuser assembly; and
a plurality of thrust pads attached to said spherical lower section and to said diffuser assembly for supporting said diffuser assembly.

5. The liquid metal pump according to claim 4 wherein said pump further comprises a fluid inlet and a fluid outlet on said spherical lower section and arranged at 90° to each other.

6. The liquid metal pump according to claim 5 wherein said diffuser assembly is connected to said fluid outlet.

7. The liquid metal pump according to claim 6 wherein said pump further comprises internal guides disposed in said spherical lower section for guiding said liquid metal to said impeller.

* * * * *